May 5, 1970   L. G. SCHOWALTER   3,509,943
SENSING MECHANISM
Filed March 7, 1968

INVENTOR.
LEWIS G. SCHOWALTER.
BY
SETTLE, BATCHELDER & OLTMAN.
ATT'YS.

United States Patent Office 3,509,943
Patented May 5, 1970

3,509,943
SENSING MECHANISM
Lewis G. Schowalter, Racine, Wis., assignor to J. I. Case Company, Racine, Wis., a corporation of Wisconsin
Filed Mar. 7, 1968, Ser. No. 711,417
Int. Cl. A01b 63/112
U.S. Cl. 172—7                    6 Claims

ABSTRACT OF THE DISCLOSURE

A draft sensing mechanism for sensing variations in draft load between an implement and a tractor. The sensing mechanism includes a toggle linkage interposed between the implement hitch and the tractor which is normally biased to a first position corresponding to a predetermined draft load on the implement. A follower member is connected to the toggle linkage to indicate changes in position thereof in response to changes in draft load on the implement. The linkage is normally biased to a first position by a spring with the first position being adjustable to accommodate changes in the predetermined draft load on the implement.

BACKGROUND OF THE INVENTION

The present invention relates generally to draft control systems for maintaining a generally constant draft on the tractor having an implement connected thereto and more particularly to a sensing mechanism for detecting changes in draft load on the tractor.

Many present day agricultural tractors have an implement hitch which includes a pair of draft arms pivotally connected to the tractor at one end thereof with the opposite end having the implement connected thereto. The draft arms are normally raised and lowered through lift arms having their free ends connected through cranks to a rockshaft with the rockshaft being rotated in opposite directions by a hydraulic actuator capable of being moved in opposite directions to raise and lower the implement. This type of control system usually includes a manual control lever located in the operator's compartment of the tractor which is capable of being set to predetermine positions and which in turn actuates a hydraulic control valve to selectively supply fluid to the opposite ends of the hydraulic actuator.

Also, means are generally provided for maintaining a predetermined position of the implement hitch with respect to the tractor and for maintaining a constant draft load between the implement and the tractor. Thus, generally it is customary to provide some means for detecting the position of the rockshaft with a suitable connection to the control valve to actuate the control valve whenever the rockshaft moves or rotates from a predetermined setting.

Likewise, means are generally provided for actuating the control valve in response to variations in draft load between the implement and the tractor.

While many sensing mechanisms for detecting changes in draft load have been proposed, most of these mechanisms have been very complicated in construction as well as very difficult to accurately control. One example of a very complicated sensing mechanism is disclosed and claimed in the Bunting Pat. No. 2,715,863.

SUMMARY OF THE INVENTION

The present invention provides a simple and inexpensive sensing mechanism which may be employed with different implements requiring different ranges of draft load during operation. Generally speaking, the present invention provides a sensing mechanism which is interposed between an implement hitch and a tractor and which includes pivotally connected toggle links which are normally biased to a first position. The first position of the linkage is adjustable and the linkage is expanded by increases in draft load applied to the implement hitch. A follower rod is connected to the linkage to sense any movement of the pivot thereby indicating a change in draft load applied to the implement.

Accordingly, the primary object of the present invention is to provide a simple and efficient draft sensing mechanism for measuring changes in draft load imposed upon a tractor by a tractor-drawn implement.

Another object is to provide a draft sensing mechanism which is capable of absorbing a predetermined draft between the implement and the tractor without effecting the change in position of the mechanism.

A further object of the present invention is to provide a draft sensing mechanism of the above type in which the output of the sensing mechanism varies nonlinearly with the draft load imposed upon the implement hitch.

Other objects of this invention will appear in the following description and appended claims reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

DETAILED DESCRIPTION

Figure 1:
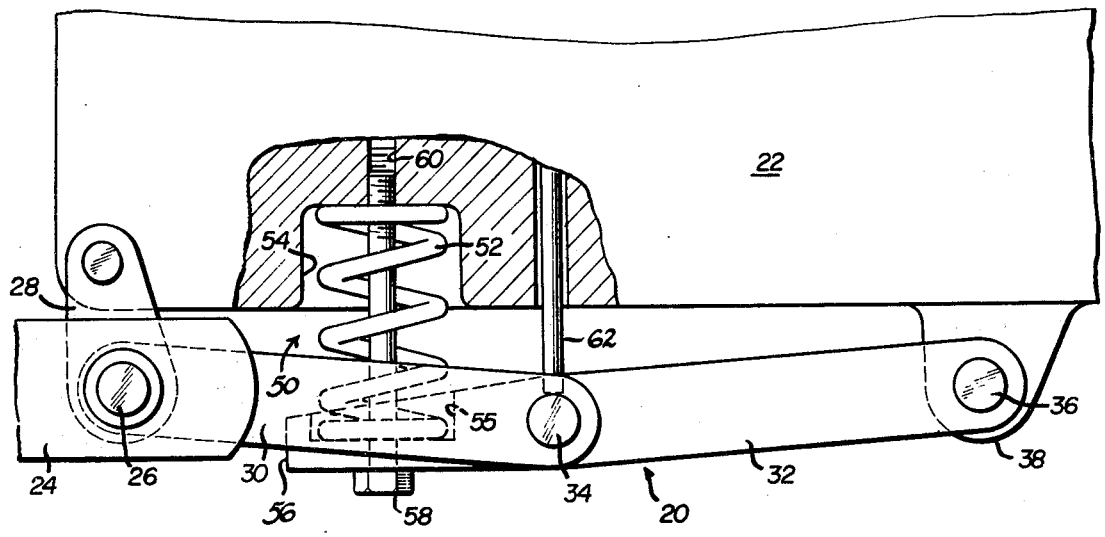
FIG. 1 shows a side elevational view of the draft sensing mechanism of the present invention attached to the lower frame portion of an agricultural vehicle.
Figure 2:
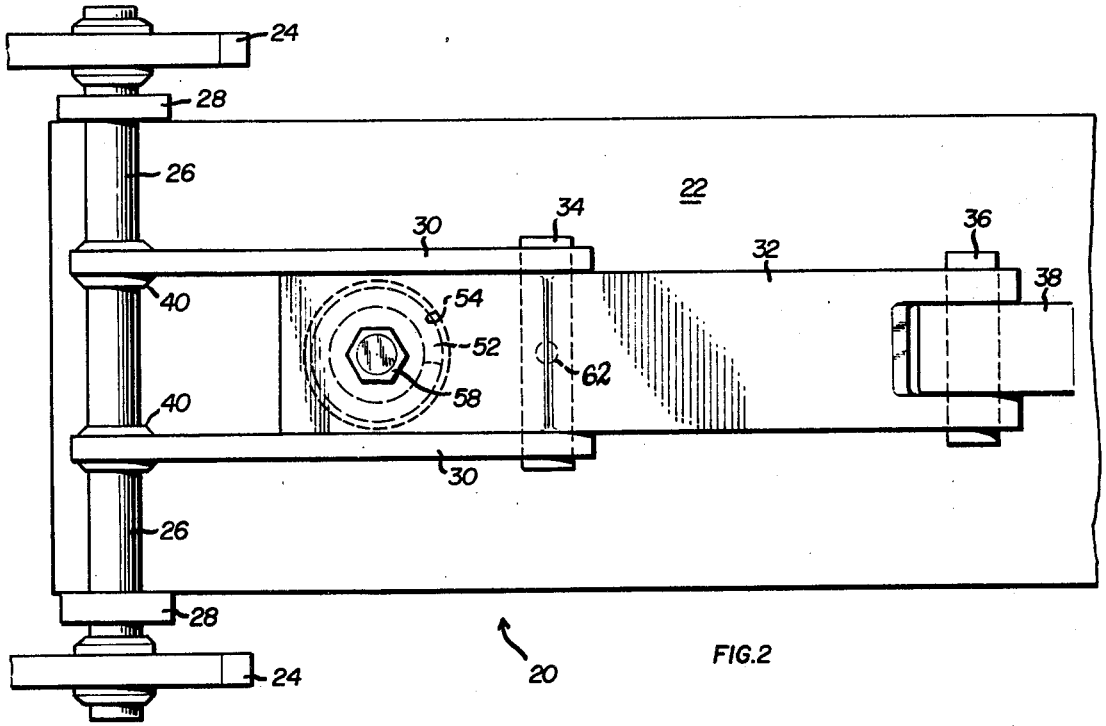
FIG. 2 is a bottom view of the vehicle and the mechanism shown in FIG. 1.

FIGS. 1 and 2, generally speaking, illustrate an expansible draft sensing mechanism 20 interposed between the bottom of the tractor housing 22 and the draft arms 24 which have an implement (not shown) connected thereto. Conventionally, the draft arms 24 have one end connected to a cross shaft 26 which is pivoted by links 28 to the bottom of the tractor housing and movable generally longitudinally thereof in response to changes in load on the draft arms. The draft arms 24 are raised and lowered through a suitable hydraulically actuated control mechanism (not shown) which is actuated by a control valve to raise and lower the draft links 24. Since all of these elements are conventional in many tractors, no detailed disclosure thereof appears to be necessary.

According to the present invention, the sensing mechanism 20 comprises an expansible member or toggle linkage including links 30 and 32 pivotally interconnected at one end thereof by a pin 34. The free end of the link 32 is pivotally connected through pin 36 to a lug 38 formed integral with the tractor housing 22 while the free end of the links 30 are pivotally interconnected through bearings 40 to the cross shaft 26. While two links 30 are shown, it is readily apparent that only a single link is necessary for carrying out the present invention.

The expandible member or toggle linkage is normally biased to a first position by spring biasing means 50, which will now be described. The spring biasing means 50 is illustratively shown as a compression spring 52 having one end received in a recess 54 formed in the bottom of the tractor housing 22. The opposite end of the spring is received in a recess 55 formed in an extension 56 provided as an integral part of the link 32. The biasing means 50 further includes a bolt 58 threadedly received in an opening 60 formed in the tractor housing 22 within the recess 54. Follower means 62 are connected to the pivot 34 and extend through the tractor housing 22 to be connected to a suitable control mechanism, such as a hydraulic control valve (not shown).

OPERATION

The operation of the draft sensing mechanism 20 can readily be appreciated from the above description. Thus, a draft load imposed upon the links 24 will move the cross shaft 26 leftwardly as viewed in FIGS. 1 and 2 thereby moving the end of the toggle link 30 connected to cross shaft 26 away from the pivot pin 36 defining a fixed pivot point for the toggle link 32. Thus, the rearward movement of the cross shaft 26 will cause the pivot 34 of the toggle linkage to move upwardly thereby moving the follower 60 a corresponding amount. It will be readily apparent that the movement of the follower 62 will indicate the movement of the pivot 34 as a function of changes in draft load on the draft arms or links 24.

According to another aspect of the invention, the adjustable mechanism or bolt 58 is capable of providing a predetermined draft load below which the entire sensing mechanism will be insensitive to changes in draft load. Thus, by proper adjustment of the bolt 58, a predetermined spring force may be applied to the toggle linkage so that the draft load on the draft arms 24 must reach a predetermined valve before any change is detected.

Preferably, the amount of movement of the follower 62 should decrease as the draft forces increase. This is of considerable advantage in producing a sensing mechanism which is capable of operating throughout a large range of draft loads. Generally, when the draft load is small, it is desirable to have an indicated change with small changes in draft forces or load on the implement while, when a larger draft load is normal, a larger change of draft load per unit of movement of the follower is desirable so as to provide a more acceptable type of sensing mechanism.

Figure 3:
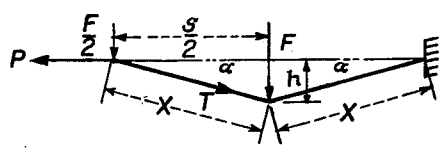
FIG. 3 is a diagrammatic illustration of the forces acting on the toggle linkage.

The utilization of the toggle linkage of the present invention allows for an increase in draft forces per incremental unit of movement of the toggle pivot. Assuming the toggle links to be equal in length (note the links may be of unequal length) and referring to FIG. 3 of the drawings, the draft force (P) will be $$P = T \cos \alpha$$

while the spring force (F)

$$F = 2T \sin \alpha$$

and $$h = .5s \tan \alpha$$

Therefore: $F = 4Ph/s$

However, $F = F_o + k(h_o - h)$ where $F_o$ is the spring force at preload, $k$ is the spring constant, $h_o$ is the position at preload
and $$s = 2\sqrt{x^2 - h^2}$$

Thus $$kh = F_o + kh_o - 4Ph/2\sqrt{x^2 - h^2}$$

assuming that $h$ is less than one (1) inch and considerably less than $x$, then $h^2$ is very much less than $x^2$ and $$h = (F_o + kh_o) \, x/2P + kx \text{ (approximately)}$$

It can be seen from this equation that the amount of movement of the pivot pin 34 and the follower 62 is a nonlinear function of the draft force (P). Also, the behavior of the sensing mechanism may be varied by changing the load spring rate, the angular working range of the toggle links and/or the length or the relative length of the toggle links.

SPECIFIC EXAMPLE

Assuming the minimum draft force desired to be detected to be 750 lbs. with the dimensions of $x$ and $h_o$ to be 11.44 inches and 0.875 inches respectively, the initial spring force required would be approximately 115 lbs.

Selecting a maximum draft load of 12,500 and a dimension of $h$ at this load to be 0.125 with $s$ having a maximum dimension of 22.874 inches based upon the link dimension of 11.44 inches, the maximum spring force required would be approximately 273 lbs. Thus the spring constant for the above range of draft load would be 210 lbs. per inch.

Of course any desired minimum draft force and draft range may be achieved with the present invention.

While one exemplary embodiment of the invention has been described in detail, it will be apparent to those skilled in the art that the disclosed embodiment may be modified. Therefore, the foregoing description is to be considered exemplary rather than limiting, and the true scope of the invention is that defined in the following claims:

I claim:

1. A draft sensing mechanism interposed between an implement hitch connected to a vehicle for longitudinal and pivotal movement therewith comprising a toggle linkage pivotally interconnected and having the free end of one link pivoted on said vehicle and the free end of a second link operatively connected with one end of said hitch for longitudinal movement therewith, biasing means moving said linkage to a first position corresponding to a predetermined draft load on the hitch, the biasing means including a spring interposed between one of said links and said vehicle and an adjustable member having the spring positioned thereon and being interposed between said one of said links and said vehicle so as to both vary said first position and the spring bias, and means engageable with the pivot of said linkage for generating a signal indicating changes in draft load on said implement.

2. A draft sensing mechanism as defined in claim 1, in which said engageable means includes a follower rod engageable with and movable in response to movement of said pivot.

3. In an apparatus for controlling the magnitude of draft exerted upon a vehicle by an implement connected by a hitch to said vehicle, said apparatus comprising a draft sensing mechanism interposed between the hitch and the vehicle, the improvement of said mechanism comprising to toggle linkage having first and second links interconnected by a pivot pin and having opposite free ends respectively pivotally connected to said vehicle and said hitch, biasing means normally maintaining said toggle linkage in a first position but yieldable in response to changes in draft force, the biasing means including a compression spring and an adjustable member having the spring positioned thereon and being interposed between said one of said links and said vehicle and being adjustable to vary the compression of the spring and also said first position, and means engageable with said pivot pin and indicating changes in the position of said pivot pin as a function of changes in draft load on said implement.

4. Apparatus as defined in claim 3, in which said engageable means includes a rod like follower member engageable with said pivot pin so as to be movable in response to movement of said pivot pin.

5. In an apparatus for sensing the magnitude of draft exerted upon a tractor by an implement connected through a hitch to the tractor, a draft sensing mechanism interposed between the hitch and the tractor, said mechanism comprising pivotally interconnected links having their opposite ends respectively connected to said hitch and tractor, a compression spring interposed between said tractor and one of said links and biasing the pivot of said links to a position offset from the plane defined by the connections so as to impose a predetermined draft load on said mechanism, and an adjustable member interposed between said one of the said links and said frame for defining a first position of said pivot and also having said compression spring positioned thereon so as to vary the compression thereof, and means engageable with said pivot for generating a signal in response to movement of said pivot from said first position as a function of the changes in draft on the implement.

6. Apparatus as defined in claim 5, in which said one of said links includes an intergral extension extending beyond said pivot with said compression spring engaging said extension and the engageable means includes a follower rod engageable with and movable in response t movement of said pivot.

References Cited
UNITED STATES PATENTS

| | | | |
|---|---|---|---|
| 2,565,668 | 8/1951 | Simpson | 172—26 |
| 2,683,403 | 7/1954 | Flentie | 172— |
| 2,775,175 | 12/1956 | Dn Shane | 172—1 |
| 2,780,159 | 2/1957 | Senkowski et al. | 172—1 |
| 2,940,530 | 6/1960 | Du Shane | 172— |
| 2,968,353 | 1/1961 | Edman | 172— |
| 3,275,085 | 9/1966 | Bunting et al. | 172—1 |

FOREIGN PATENTS 1,094,226  12/1967  Great Britain.

ROBERT E. BAGWILL, Primary Examiner

A. E. KOPECKI, Assistant Examiner